United States Patent [19]
Fisher

[11] 3,916,831
[45] Nov. 4, 1975

[54] ANIMAL LITTER EXCREMENT CONTROL SYSTEM

[76] Inventor: Stanton E. Fisher, 16 Brentmoor Park, St. Louis, Mo. 63105

[22] Filed: Oct. 20, 1971

[21] Appl. No.: 191,122

[52] U.S. Cl. .................................................. 119/1
[51] Int. Cl.² ........................................... A01K 29/00
[58] Field of Search ............................. 119/1; 99/81

[56] References Cited
UNITED STATES PATENTS

| | | | |
|---|---|---|---|
| 1,165,646 | 12/1915 | Bailey | 99/81 X |
| 3,059,615 | 10/1962 | Kuceski et al. | 119/1 |
| 3,286,691 | 11/1966 | McFadden | 119/1 |
| 3,425,397 | 2/1969 | Schulein | 119/1 |

*Primary Examiner*—Hugh R. Chamblee
*Attorney, Agent, or Firm*—Sidney B. Ring; Hyman F. Glass

[57] ABSTRACT

A system for animal excrement control which comprises the use of popcorn as a means of adsorbing and/or absorbing excrement. Animal litter so made may be employed as such, or may be impregnated with an additive such as a bactericide, an antioxidant, a deodorizer, chlorophyl, etc., dyes to give the desired color, etc.

Popcorn, preferably employed in the form of small particles (i.e., comminuted) may be employed alone or in conjunction with other types of animal litter such as clays, bentonites, plastics, chlorophyl-containing litters such as dehydrated grasses, for example alfalfa, etc.

8 Claims, No Drawings

ANIMAL LITTER EXCREMENT CONTROL SYSTEM

This invention relates to excrement control and more particularly to animal excrement control.

There are in present use a wide variety of products for the disposition of animal excrement. One widely used product is known as "Animal Litter" which describes a wide variety of high surface materials such as clay, bentonites, Fullers Earth, vermiculite, diatomaceous earth, etc., in various forms and combinations. These products have certain deficiencies. For example, they are very heavy per unit of absorbing and/or adsorbing volume and are therefore extremely expensive to ship from source to consumer. These materials are not biodegradable and therefore cannot be flushed away.

Since the location of various sources of supply of the animal litter material are far removed from the location of use, the heavy weight of litter material greatly increases the costs of production and distribution.

I have now devised an excrement control system which is characterized by the use of popcorn, preferably comminuted to a high surface area which has the ability of effectively absorbing and/or adsorbing excrement. Such materials have high surface areas which are very effective in absorbing and/or adsorbing excrement. They have a low weight per unit of absorbing/adsorbing volume, thus minimizing the costs of shipping and distribution. Being organic in nature, popcorn is biodegradable and can be disposed of by flushing in the toilet. It can be sold in any suitable container and being light it can be handled with ease.

Popcorn is a type of corn having kernels which on exposure to heat burst open by explosion of the contained moisture, thus forming a white starchy expanded mass.

Where particle size is important such as with cats who like to cover their excrement, particle sizes of about 1/16 to ½ inch, for example from about ⅛ to ⅜ inch, but preferably about ¼ inch ± 1/16 inch can be employed. Larger or smaller particles can also be employed in certain instances.

In order to increase its hydrophilic properties it is often desirable to treat the popcorn with surfactants capable of rendering the popcorn more hydrophilic, i.e., water absorptive and/or adsorptive. In addition, certain bactericides serve a dual function, i.e., they not only prevent decomposition of the wastes to odiferous products, but also render the surface of the popcorn more hydrophilic.

For example -- a bactericide such as $$R-\overset{CH_3}{\underset{CH_3}{N^\oplus}}-CH_2CH_2OCH_2CH_2\overset{CH_3}{\underset{CH_3}{N^\oplus}}-R \cdot 2X^\ominus$$

where R is a hydrocarbon group (such as $C_8$ to $C_{18}$) and X is a halide such as chlorine, etc., acts as both a bactericide and a surfactant.

Suitable hydrophilic surfactants or wetting agents are those conventionally employed in home and industry for washing dishes, clothes, as janitorial, etc., materials.

A typical surfactant is an oxyalkylated alkylphenol such as oxyethylated nonylphenol, for example

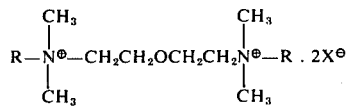

A typical antioxidant is 6-ethoxy-1,2-dihydro-2,2,4-trimethyl quinoline.

Bactericides, antioxidants, deodrants are employed to prevent or mask odors. Bactericides and antioxidanats do so by inhibiting the breakdown of excrement into odiferous products. For esthetic reasons it may be advantageous to dye the popcorn any desirable color such as green to indicate freshness, brown to obscure the color of the animal excrement, a color to indicate source, i.e., in the nature of a trademark, etc.

After use, the popcorn can be disposed of by any desirable means such as by flushing down the toilet, burying in the earth, etc.

One method of reducing odors is to spray the popcorn with chlorophyl or any other suitable odor reducer or masker which is not offensive to the animal. Popcorn may also be dyed to any suitable color.

In addition, popcorn may also be admixed with suitable amounts of other animal litters such as clays, bentonites, alfalfa, etc., in ratios of from about 1 to 50 percent by volume or more of the non-popcorn material, such as from 5 - 40 percent, but preferably employed from 10 - 25 percent.

The following examples are presented by way of illustration and not of limitation.

EXAMPLE 1

Popcorn is placed in a container having the following dimensions: Two feet by 1½ feet to a depth of 1.5 - 2 inches. This system is employed as an animal litter.

EXAMPLE 2

Example 1 is repeated except that the popcorn is pretreated with a bactericide. This system is employed as animal litter.

EXAMPLE 3

Popcorn is pretreated with a wetting agent and set up in the manner of Example 1 and employed as animal litter.

EXAMPLE 4

Example 3 is repeated except that the popcorn is pretreated with a bactericide to yield an animal litter.

EXAMPLE 5

Popcorn is ground to yield particles having a diameter of ⅛ - ¼ inch and used as animal litter.

EXAMPLE 6

Examples 1 and 5 are repeated except that the popcorn is sprayed with a chlorophyl solution containing a green dye to yield an animal litter.

EXAMPLE 7

Examples 1 and 5 are repeated except that the system contains 25 percent by volume of dehydrated alfalfa to yield an animal litter.

EXAMPLE 8

Examples 1 and 5 are repeated except that the system contained 25 percent by volume of a commercial clay or bentonite animal litter.

EXAMPLE 9

Examples 1 and 5 are repeated except that the system also contains both 25 percent by volulme of dehydrated alfalfa and 25 percent by volume of a commercial clay or bentonite animal litter.

In summary, popcorn provides a system for treating animal wastes with light, bulky, absorbing and/or adsorbing high surface area materials which may also be treated with antioxidants, bactericides, etc., to inhibit the breakdown of excrement into odiferous products. It can be dyed to any desired color. The use of suitable auxiliary agents produces animal litter of which the above is intended to be illustrative and non-limiting.

Having thus described my invention, what I claim as new and desire to obtain by letters patent is:

1. An animal litter excrement control system comprising a composition of popcorn in the popped or effloresced state together with one or more other conventional animal litter ingredients including clays or chlorophyl-containing grasses.

2. The animal litter excrement control system of claim 1 where the said popcorn is in a particulate form having a particle size of from 1/16 to ½ inch.

3. The animal litter excrement control system of claim 1 wherein said popcorn has been treated with a surfactant to enhance its water-absorbing properties, its water-adsorbing properties or its water-absorbing and water-adsorbing properties.

4. The animal litter excrement control system of claim 1 which also contains an agent capable of inhibiting the breakdown of excrement into odiferous products.

5. The animal litter excrement control system of claim 4 where the agent capable of inhibiting the breakdown of excrement into odiferous products is a bacteriocide.

6. The animal litter excrement control system of claim 5 where the bacteriocide is

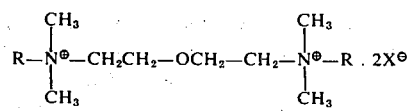

where R is a hydrocarbon group of 8 to 18 carbon atoms and X is chlorine.

7. The animal litter excrement control system of claim 3 wherein the surfactant used is an oxyethylated nonylphenol.

8. The animal litter excrement control system of claim 7 where the oxyethylated nonylphenol is

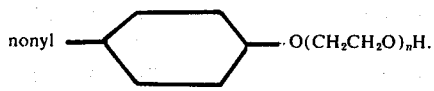

* * * * *